United States Patent Office 2,848,436
Patented Aug. 19, 1958

2,848,436

PREPARATION OF PHENOLIC RESINS

Roger M. Christenson, Whitefish Bay, Wis., assignor to Pittsburgh Plate Glass Company, Allegheny County, Pa., a corporation of Pennsylvania No Drawing. Application May 3, 1954
Serial No. 427,384

4 Claims. (Cl. 260—53)

This invention relates to the preparation of phenol-aldehyde type resins of improved color and film appearance, and pertains more particularly to the condensation of a phenol and an aldehyde in the presence of a soluble hydrosulfite.

Resinous condensation products obtained by condensing a phenolic compound with an aldehyde such as formaldehyde, normally in the presence of an alkaline condensation catalyst, are widely used for many purposes, for example, as the resinous component of coating compositions and in the preparation of molding powders and laminates. However, phenol-aldehyde condensation products frequently tend to darken undesirably, this characteristic obviously precluding their use in applications where light colored products are required.

One cause of darkening is the presence of very small quantities of di- and trivalent ions of metals such as iron, copper, cobalt and the like. This darkening is especially noticeable when thin films of the resin are applied to metallic surfaces, particularly black iron surfaces. The harmful coloring effect of metallic ions can be substantially overcome by treating the resin with a complexing agent, for example, a chelating or sequestering agent such as ethylenediamine tetra-acetic acid, according to the method disclosed in copending application, Serial No. 427,387, filed May 3, 1954, now abandoned.

A second cause of darkening, and one which is not overcome by the use of a complexing agent, is the presence in the phenolic compound of small quantities of compounds of the quinone series including 1,4-benzoquinone, 1,2-benzoquinone, chloranil (tetrachloro-para-benzoquinone) and the like. Numerous attempts have been made to overcome the harmful darkening effect on phenolic resins caused by the presence in the resins of small quantities of quinones. One such procedure involves the maintenance of a blanket of an inert gas such as nitrogen over the condensation reaction mixture throughout the entire period during which the condensation is carried out. This procedure, in addition to being somewhat inconvenient, actually does not prevent color formation to the extent necessary in order that the phenol-aldehyde condensation product can be utilized in all applications. A second attempt to eliminate undesirable color formation involves the addition to the resin in the acidic stage of a strong reducing agent such as nascent hydrogen or ferrous chloride to reduce the quinone to the less harmful hydroquinone form. Such reducing agents tend to prevent darkening in certain phenol-aldehyde resins, but actually cause resins prepared from alkenylphenols and aldehydes to darken to a greater degree than when no reducing agent is present. Moreover, it had heretofore been believed that the reducing agent must be added after alkaline condensation had taken place, that is, after acidification of the phenol-aldehyde condensation products had been carried out.

It has now been discovered, however, that when one or more phenolic compounds are condensed with an aldehyde, particularly formaldehyde, in the presence of an alkaline condensation catalyst, and a water soluble hydrosulfite, darkening due to the presence of quinone type compounds is substantially eliminated and light colored resinous condensation products are assured without the necessity of providing a blanket of inert gas over the reaction mixture. The light colored resins prepared by this process are particularly useful in sanitary can liners and in other coating compositions where light color is desired.

The use of an alkali-metal hydrosulfite in the preparation of phenol-aldehyde condensation products gives good results regardless of the phenolic compound or compounds employed in the condensation reaction. For example, phenol itself, or alkyl substituted phenols such as the cresols, xylenols, and the like may be employed.

However, the alkali metal hydrosulfites are particularly useful in the preparation of resinous condensation products of alkenylphenols with aldehydes, a new class of phenolic resins, the preparation of which is disclosed in copending application Serial No. 390,089, filed November 3, 1953. The resins prepared by the alkaline condensation of an alkenylphenol or a mixture of alkenyl-phenols with an aldehyde are extremely compatible with vinyl resins, varnishes, drying oils and other materials utilized in the preparation of coating compositions, and produce films which are fast drying and curing and which possess excellent alkali resistance and electrical properties.

In general, the alkenylphenolic compounds which alone or in admixtures with one or more other alkenylphenolic compounds or phenol or an alkyl substituted phenol are condensed with an aldehyde possess the structure:

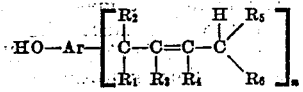

wherein Ar is an aromatic radical, $R_1$, $R_2$, $R_3$, $R_4$, $R_5$, and $R_6$ are hydrogen, halogen or an organic radical, such as a hydrocarbon radical, and which may be the same or different, and $n$ is a number, ordinarily from 1 to 3.

Alkenylphenolic compounds of the above structure are all readily obtained by the reaction of phenolic compounds with conjugated dienes in accordance with methods described in copending applications, Serial No. 300,359, filed July 22, 1952, and Serial Nos. 337,226, 337,227, 337,228, and 337,229, all filed February 16, 1953.

The preferred alkenylphenolic compounds for condensation with aldehydes in the presence of an alkaline catalyst, and an alkali metal hydrosulfite, are mixtures of the butenylphenols, including ortho- and para-2-butenylphenols, di-2-butenylphenols, and tri-2-butenylphenols. However, mixtures of other alkenylphenolic compounds may also be used, including butenylcresols, butenylcatechols, butenyl-2,3-dimethoxyphenols, mono-, di- and tributenylresorcinol, mono-, di- and tributenyl-guaiacol, 2-chlorobutenylcresol, 2-chlorobutenylphenol, 2-iodobutenylphenol, ortho- and para-cyclopentenyl-phenol, pentenylphenol, pentenylcresol, pentenylguaiacol, halopentenylphenols, halopentenyl guaiacols, and the like.

The mixture of alkenylphenols which is condensed with an aldehyde may vary widely in composition. Ordinarily, the predominant component of the mixture is one or more monoalkenylphenols (including ortho- and para-monoalkenylphenols), the monoalkenyl component constituting about 55 to 85 percent by weight of the total mixture. The balance of the mixture (about 15 to 45 percent) is composed primarily of di- and trialkenyl-phenols, although other phenolic materials including polyphenols such as alkane, di- and tri-phenols may also be present, depending upon the method by which the alkenylphenol mixture is prepared.

In carrying out the condensation of a mixture of alkenylphenols with an aldehyde such as formaldehyde and in the presence of a water soluble hydrosulfite in accordance with this invention, an alkaline catalyst is preferably employed. Suitable alkaline materials include sodium hydroxide, potassium hydroxide, barium hydroxide, sodium carbonate, potassium carbonate, ammonia, hexamethylenetetramine and the like.

The quantity of catalyst employed is generally such that about one fourth equivalent of catalyst is present for each equivalent of alkenylphenolic compounds. Based upon the total weight of the reactants, about 0.5 percent to about 5.0 percent is utilized. Larger amounts of the catalyst may be employed if desired although for obvious economic reasons, larger amounts are not preferably utilized.

Alternatively, the catalyst may be dispensed with entirely, although higher reaction temperatures may then be required with attendant increase in darkening of the resinous product.

The molar ratio of aldehyde to alkenylphenols utilized in carrying out the condensation reaction may be varied widely. Best results are obtained when about 2.0 moles of the aldehyde are utilized for each mole of the alkenylphenolic compounds in the reaction mixture. However, the ratio may be as low or lower than 0.5 to 1.0 or as high or higher than 5.0 to 1.0. When the ratio is much below the preferred 1.5 to 1.0 ratio, the resinous product tends to be hard. When the ratio is substantially above 2.0 to 1.0 good results are obtained but there is no economical advantage in utilizing such large excess of the aldehyde.

Any water soluble hydrosulfite such as sodium hydrosulfite, potassium hydrosulfite, lithium hydrosulfite, ammonium hydrosulfite and the like may be employed to prevent color formation in accordance with the method of the present invention. Preferably the alkali metal hydrosulfites are used. Sodium hydrosulfite, $Na_2S_2O_4$, is especially preferred since it is a readily available white or grayish-white crystalline powder which is very soluble in water. Consequently, it can be added to the condensation reaction mixture either as an aqueous solution or in crystalline form as it will quickly dissolve in the water present.

The quantity of the soluble hydrosulfite utilized may also be varied widely with good results. For example, amounts as low as about 0.10 percent by weight, based upon the total weight of the phenolic compound and aldehyde utilized, may be employed, as may amounts as large as 5.0 percent by weight, although for reasons of economy, the larger amounts are not preferably employed.

The condensation reaction is best carried out by first admixing the phenolic compound and the catalyst and the hydrosulfite, utilizing sufficient cooling to maintain the resulting reaction mixture at about room temperature (25° C.). When solution is obtained the aldehyde is added at a moderate rate and cooling is applied as needed to keep the temperature below about 35° C. Stirring is continued for about 48 hours at room temperature.

At the end of this time the reaction mixture is carefully acidified to a pH of about 5.0 with a mineral acid such as hydrochloric acid or sulfuric acid, or a carboxylic acid such as acetic or propionic acid. Two layers are formed, a water layer and a phenolic resin layer. The water layer is drawn off and the water-insoluble layer of resin is water-washed 4 or 5 times. At this point it is advantageous to add about 0.1 percent by weight of a complexing agent such as an aminotetracarboxylic acid (for example, ethylenediamine tetraacetic acid) which forms a complex with and inactivates any metallic ions in the reaction mixture. The resin is then dehydrated by vacuum stripping at steam temperature and a pressure of about 20 mm. to 55 mm. Alternatively, the water can be removed by adding butanol and then carrying out an azeotropic distillation.

While the above-described method for carrying out the condensation is preferred, particularly when a mixture of butenylphenols is employed, other methods of carrying out the condensation, for example, simply by admixing the reactants and catalyst and allowing the mixture to stand at room temperature for about 48 hours, or by maintaining the reaction mixture at temperatures as high as 100° C. or higher, may also be utilized. In the event that higher temperatures are employed, the condensation will, of course, require less time than when the condensation is carried out at room temperatures.

The following examples illustrate more fully the preparation of resins by the condensation of a mixture of alkenylphenols with an aldehyde in the presence of a water soluble hydrosulfite. The examples are not, however, intended to limit the scope of the invention, for there are, of course, numerous possible variations and modifications.

*Example I*

The following materials were charged into a glass lined reactor:

24.6 pounds mixed butenylphenols (including monobutenylphenols, di- and tributenylphenols)
27.0 pounds formalin solution (37 percent formaldehyde)
1.7 pounds sodium hydroxide
1.7 pounds water
0.12 pound sodium hydrosulfite The resulting mixture was cooled to 75° F. to 80° F. and the reaction mixture agitated for 5 hours after which it was allowed to stand for an additional 43 hours. The reaction mixture was then acidified to a pH of 5.0 with 68 percent sulfuric acid, and allowed to stand until the water layer settled out. The water layer was then drawn off and discarded. The wet resin (36.25 pounds) was treated with 0.04 pound of ethylenediamine tetraacetic acid (a product known commercially as Sequestrene AA). The resin was then heated to 220° F. and stripped with an inert gas (nitrogen) until a Gardner viscosity of W at 75 percent solids in n-butanol was reached. The resin was then thinned with 10 pounds of n-butanol and filtered at 110° F. The following is the analysis of the final resinous material:

Weight per gallon _____ 8.45 pounds.
Solids _____ 66.24 percent at 110° C.
Viscosity _____ Q to R (Gardner).

The resin thus prepared was roller coated on tin plate and cured at 350° F. for 20 minutes. The resulting film was of a thickness such that the film weighed 16 mgs./4 sq. in. and was extremely light colored, mar-resistant and insoluble in acetone.

*Example II*

Sixteen hundred twenty grams of a mixture of pentenylphenols, 1620 grams of formalin solution (37 percent formaldehyde), 100 grams sodium hydroxide, and 100 grams of water, and 8 grams of sodium hydrosulfite were charged into a glass reactor, and the resulting mixture stirred for 48 hours at a temperature of 25° C. to 30° C. The reaction mixture was acidified with 70 percent sulfuric acid until a pH of about 5.0 was reached. The water layer which had formed was drained off and 2 grams of ethylenediamine tetraacetic acid were added to the resin layer. The resin layer was then dried by blowing with an inert gas for 3 hours at 100° C. to give a resin having a viscosity of $Z_6$. This resin was thinned with 622 grams of butanol to give a final product having 63.7 percent solids, and a viscosity of V. The resulting resin was extremely light colored and baked to a hard, acetone resistant film, in generally the same manner as resins prepared from a mixture of butenylphenols.

*Example III*

To illustrate the superior results obtained by utilizing the soluble hydrosulfites in phenol-aldehyde resin preparation, resins were prepared according to the method of Example I, utilizing sodium hydrosulfite, zinc dust, phenyl hydrazine, and hydroxylamine respectively, in four preparations. The Coleman transmittancy, the Coleman absorption, the color of the resin after acidification, and the color of the resin after a film thereof was dried are set forth in the table below:

| Reducing Agent | Coleman Transmittancy, percent | Coleman Absorption | Color Before Acidification | Color After Acidification | Color After drying |
|---|---|---|---|---|---|
| Sodium hydrosulfite | 24 | 620 | 5 | 4-5 | 6-7 |
| Zinc Dust | 10 | 1,000 | 8-9 | 5-6 | |
| Phenyl Hydrazine | 14.5 | 840 | 10 | 15-16 | 14 |
| Hydroxylamine | 17 | 770 | 9-10 | 10-11 | 10 |

In the above table the Coleman transmittancy and absorption were carried out at a wave length of 450 millimicrons and the colors indicated are on the Gardner color scale. The results set forth in the table demonstrate clearly that the hydrosulfite reduces the color of phenol-aldehyde resins far better than other reducing agents.

*Example IV*

Three hundred seventy grams of phenol, 420 grams of formalin (37 percent formaldehyde) and a solution of 3.2 grams of sodium hydroxide in 20 cc. of water were charged into a glass lined reactor and heated to 104° C. and refluxed at this temperature for 45 minutes. The flask was then immersed in a cold water bath and cooled to 35° C. The resulting resin had a Gardner color of 4, a Coleman absorption at 450 millimicrons of 510, and a Coleman transmittancy of 30.5 percent. A baked film of the resin was dark red in color.

A phenol-formaldehyde resin was prepared utilizing the same quantities of reactants as set forth in the foregoing paragraph except that 3.7 grams of sodium hydrosulfite were included in the reaction mixture. The condensation was carried out under reflux at 104° C. for 45 minutes and the condensation product immersed in a cold water bath and cooled to 35° C. The resulting resin had a Gardner color of 2 to 3, a Coleman absorption at 450 millimicrons of 210, and a Coleman transmittancy of 62.5 percent. A baked film of this resin was extremely light in color.

This example demonstrates again that the water soluble hydrosulfite prevents substantial color formation in resins prepared from phenol and formaldehyde.

Resins prepared according to the foregoing examples possess many valuable properties; for example, films prepared with resins obtained by the condensation of a mixture of alkenylphenols with an aldehyde in the presence of sodium hydrosulfite are tough, transparent and glossy after only 3 minutes heating at about 150° C. Moreover, when alkenylphenolaldehyde resins are plasticized with small quantities of a polyvinylacetal resin, preferably polyvinylbutyral, the resins cure in only 10 minutes at 175° C., and at even lower temperatures when catalyzed with materials such as phosphoric acid, toluene-sulfonic acid, or the like. The plasticized resin also possesses extremely good alkali resistance, withstanding 200 hours immersion in 3 percent alkali without loss of adhesion, blistering or hydrolysis.

Other advantages possessed by the resins of this invention include excellent solvent resistance, extremely light color in thin films with no discoloration on overbaking, good flexibility, impact resistance and adhesion, excellent hardness and non-marring surface, good solubility, good compatibility and high solids content at medium viscosity. One particular advantage is that they do not impart taste to foods.

The alkenylphenol-aldehyde resins of the present invention are reactive due to the presence of the additional unsaturated linkage in the side chain or chains and are in themselves capable of condensing with a variety of other materials to provide products having improved properties. For example, drying oils add a substantial degree of flexibility to the baked resin films. The resins have also been blended or compounded with such other materials as linseed alcohols, styrenated maleinized alkyds having excess hydroxyl groups, epoxy resins, and with synthetic rubbery materials such as polybutadiene. In each instance excellent film forming properties were obtained.

From the foregoing description of the invention it will be seen that the use of a soluble hydrosulfite in the condensation reaction of phenols with aldehydes constitutes a new and valuable method of obtaining light colored resins. It is apparent, therefore, that various embodiments of the invention, in addition to those specifically disclosed, may be provided without departing from the spirit and scope of the invention as defined in the appended claims.

I claim:

1. The method which comprises condensing a mixture of alkenylphenols containing from 4 to 5 carbon atoms in each alkenyl group with formaldehyde in the presence of an alkaline catalyst and a water soluble alkali metal hydrosulfite, thereby to obtain an oil soluble, light colored resin capable of forming fast curing, light colored films.

2. The method of claim 1 wherein the mixture of alkenylphenols is a mixture of butenylphenols.

3. The method of claim 2 wherein the alkali metal hydrosulfite is sodium hydrosulfite.

4. The method which comprises condensing a mixture containing about 55 to 85 percent monobutenylphenols and 15 to 45 percent of di- and tributenylphenols with formaldehyde in the presence of an alkaline catalyst and sodium hydrosulfite, at a temperature of about 25° C., acidifying the resultant reaction mixture, and separating therefrom an oil soluble, light colored resinous condensation product capable of forming fast curing, light colored films.

References Cited in the file of this patent

UNITED STATES PATENTS

| | | |
|---|---|---|
| 1,039,859 | Weindel | Oct. 1, 1912 |
| 2,357,798 | Niederhauser et al. | Sept. 12, 1934 |
| 2,677,675 | Nagy | May 4, 1954 |

OTHER REFERENCES

Merck Index (6th ed.), 1952, page 880.